US009113522B2

(12) United States Patent
Veenstra et al.

(10) Patent No.: US 9,113,522 B2
(45) Date of Patent: Aug. 18, 2015

(54) PULSE CONTROLLED LIGHT EMITTING DIODE DRIVER

(71) Applicant: KONINKLIJKE PHILIPS N.V., Eindhoven (NL)

(72) Inventors: Hugo Veenstra, Kleine Brogel (NL); Harald Josef Günther Radermacher, Aachen (DE); Bob Bernardus Anthonius Theunissen, Zaltbommel (NL); Adrianus Sempel, Waalre (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/353,073

(22) PCT Filed: Oct. 16, 2012

(86) PCT No.: PCT/IB2012/055618
§ 371 (c)(1),
(2) Date: Apr. 21, 2014

(87) PCT Pub. No.: WO2013/057654
PCT Pub. Date: Apr. 25, 2013

(65) Prior Publication Data
US 2014/0265891 A1  Sep. 18, 2014

Related U.S. Application Data

(60) Provisional application No. 61/549,802, filed on Oct. 21, 2011.

(51) Int. Cl.
*H05B 37/00* (2006.01)
*H05B 33/08* (2006.01)
*H05B 37/02* (2006.01)

(52) U.S. Cl.
CPC ........ *H05B 33/0818* (2013.01); *H05B 33/0827* (2013.01); *H05B 37/0263* (2013.01); *Y02B 20/346* (2013.01)

(58) Field of Classification Search
CPC ........... H05B 33/0803; H05B 33/0827; H05B 33/083
USPC ............. 315/185 R, 186, 191, 192, 291, 294, 315/297, 307
See application file for complete search history.

(56) References Cited

U.S. PATENT DOCUMENTS 6,053,622 A * 4/2000 Horowitz et al. ............. 362/276
6,452,342 B1 9/2002 Ohno
(Continued)

FOREIGN PATENT DOCUMENTS

JP  2011071310 A  4/2011
WO  2006085767 A2  8/2006
WO  2008007298 A2  1/2008
(Continued)

*Primary Examiner* — Jason M Crawford
(74) *Attorney, Agent, or Firm* — Yuliya Mathis

(57) ABSTRACT

To avoid clock signals and to separate power wiring from control wiring in a driver, and to avoid three-terminal light emitting diodes with control electrodes, a driver for driving light emitting diode circuits (10, 20, 30) is provided with first and second terminals (1, 2) for receiving a voltage signal from a source (5) and with a first switching circuit (11, 2) coupled to the second terminal (2) and to a third terminal (3). The first and the third 5 terminal (1, 3) are to be coupled to electrodes of a first light emitting diode circuit (10). The first switching circuit (11, 12) comprises a first switch (11) and a first timing circuit (12) for, in response to a first pulse signal as added to the voltage signal, activating the first switch (11) to switch on the first light emitting diode circuit (10). Sequential pulse signals may be used to sequentially switch on light emitting diode circuits (10, 20).

14 Claims, 5 Drawing Sheets

(56) References Cited

U.S. PATENT DOCUMENTS

| | | |
|---|---|---|
| 7,755,297 B2 * | 7/2010 | Lee et al. .................. 315/224 |
| 2006/0232219 A1 * | 10/2006 | Xu ........................... 315/209 R |
| 2008/0116818 A1 * | 5/2008 | Shteynberg et al. ......... 315/192 |
| 2008/0265795 A1 * | 10/2008 | Hente et al. ................ 315/291 |
| 2011/0025215 A1 * | 2/2011 | Hulett ....................... 315/185 R |

FOREIGN PATENT DOCUMENTS

| | | |
|---|---|---|
| WO | 2010064183 A1 | 6/2010 |
| WO | 2010064184 A1 | 6/2010 |

* cited by examiner

PULSE CONTROLLED LIGHT EMITTING DIODE DRIVER

CROSS-REFERENCE TO PRIOR APPLICATIONS

This application is the U.S. National Phase application under 35 U.S.C. §371 of International Application No. PCT/IB2012/055618, filed on Oct. 16, 2012, which claims the benefit of U.S. Provisional Patent Application No. 61/549,802, filed on Oct. 21, 2011. These applications are hereby incorporated by reference herein.

FIELD OF THE INVENTION

The invention relates to a driver for driving light emitting diode circuits. The invention further relates to a device.

Examples of such a device are lamps and parts thereof and supplies and parts thereof.

BACKGROUND OF THE INVENTION

WO 2008/007298 discloses a device for addressing power to a load selected from a plurality of loads. This device uses separate wiring for power and control.

U.S. Pat. No. 6,452,342 discloses a self scanning light emitting device. This device uses light emitting diodes, each having three electrodes, and it uses clock signals.

SUMMARY OF THE INVENTION

It is an object of the invention to provide an improved driver. It is a further object of the invention to provide an improved device.

According to a first aspect, a driver for driving light emitting diode circuits is provided, comprising
  first and second terminals for receiving a voltage signal from a source, and
  a first switching circuit coupled to the second terminal and to a third terminal, the first and the third terminal being arranged to be coupled to electrodes of a first light emitting diode circuit, and the first switching circuit comprising a first switch and a first timing circuit for, in response to a first pulse signal added to the voltage signal, activating the first switch.

The first and the second terminal are to be coupled to the source for receiving the voltage signal from the source. The first switching circuit is coupled to the second and the third terminal, wherein the electrodes of the first light emitting diode circuit are to be coupled to the second and the third terminal. As a result, when the first switching circuit is activated, the first light emitting diode circuit is switched on.

The first switching circuit comprises the first switch and the first timing circuit, wherein the first timing circuit, in response to the first pulse signal as added to the voltage signal, activates the first switch. As a result, no separate power wiring and control wiring are needed inside the driver. Via the first and the second terminal, power as well as control are provided. Clock signals are not required inside the driver. These are great advantages, and, hence, an improved driver has been created.

A light emitting diode circuit comprises one or more light emitting diodes of whatever kind and in whatever combination. Each light emitting diode circuit needs to have two electrodes only; a third control electrode is not required. Each light emitting diode needs to have two electrodes only; a third control electrode is not required. Thus, relatively simple, low-cost and robust light emitting diodes can be used.

An embodiment of the driver is defined by the first switch, when activated, being in a conductive mode, and staying in that conductive mode independently of the first pulse signal. In other words, in response to the first pulse signal as added to the voltage signal, the first switch is activated, and after the first switch has been activated, it stays activated independently of the first pulse signal. As a result, the first pulse signal is only used for activating the first switch and is not used for keeping the first switch activated.

An embodiment of the driver is defined by the first switch comprising a thyristor or a triac or a transistor circuit for replacing a thyristor or a triac. These kinds of first switches are relatively simple, low-cost and robust.

An embodiment of the driver is defined by the first switch having main electrodes coupled to the second and the third terminal, and the first timing circuit comprising a capacitor, one side of the capacitor being coupled to the second terminal and the other side of the capacitor being coupled to a control electrode of the first switch. This kind of first timing circuit is relatively simple, low-cost and robust.

An embodiment of the driver is defined by the other side of the capacitor being coupled via a first threshold circuit to the first terminal. The first threshold circuit for example comprises a first zener diode or a serial connection of a first zener diode and a resistor. In this case, the first threshold circuit prevents the capacitor from being charged by the voltage signal. A threshold voltage of the first zener diode may be chosen substantially equal to an amplitude of the voltage signal.

An embodiment of the driver is defined by the other side of the capacitor being coupled via a resistor to the third terminal. In this case, the first light emitting diode circuit prevents the capacitor from being charged by the voltage signal. An operating voltage of the first light emitting diode circuit may be chosen substantially equal to an amplitude of the voltage signal.

An embodiment of the driver is defined by the first timing circuit further comprising a second threshold circuit coupled in parallel to the capacitor. The second threshold circuit protects the first switch against peak voltages and may for example comprise a second zener diode or a parallel connection of a second zener diode and a resistor, wherein the resistor is used, in combination with the capacitor, to (better) define a time constant and/or to (better) discharge the capacitor when necessary.

An embodiment of the driver is defined by the first switching circuit further comprising a transistor for reducing a voltage present across the first switch when activated. In a conductive mode, particularly a thyristor and a triac may show a relatively large voltage drop across the main electrodes. Such a relatively large voltage drop may be reduced by adding a conducting transistor.

An embodiment of the driver is defined by main electrodes of the first switch being coupled to main electrodes of the transistor and a control electrode of the transistor being coupled to a detection circuit for detecting a current flowing through the first switching circuit. By detecting a current flowing through the first switching circuit, the transistor coupled in parallel to the first switch will be in a conductive mode as long as there is a sufficient amount of current flowing through the first switching circuit and will go into a non-conductive mode as soon as the amount of current flowing through the first switching circuit has decreased to zero or has dropped below a certain threshold value.

An embodiment of the driver is defined by the first pulse signal having a duration within a predefined duration range for a given amplitude of the first pulse signal, and/or the first pulse signal having an amplitude within a predefined amplitude range for a given duration of the first pulse signal, and/or the first pulse signal having a duration within a predefined duration range as well as an amplitude within a predefined amplitude range. For a first pulse signal that operates well and that has a minimal surface, a higher amplitude of the first pulse signal will allow the first pulse signal to have a shorter duration while still being able to activate the first switching circuit, and a lower amplitude of the first pulse signal will require the first pulse signal to have a longer duration in order to be able still to activate the first switching circuit. For a first pulse signal that operates well and that has a minimal surface, a longer duration of the first pulse signal will allow the first pulse signal to have a lower amplitude while still being able to activate the first switching circuit, and a shorter duration of the first pulse signal will require the first pulse signal to have a higher amplitude in order to be able still to activate the first switching circuit. Roughly, when increasing or decreasing one of the parameters, respectively, the other one may be decreased or must be increased to get the same result. A minimal surface of the pulse signal should not be reduced and could be kept stable or might be increased to guarantee operation.

An embodiment of the driver is defined by further comprising
a second switching circuit coupled to the third terminal and to a fourth terminal, the first and the fourth terminal being arranged to be coupled to electrodes of a second light emitting diode circuit, and the second switching circuit comprising a second switch and a second timing circuit for, for an activated first switch, activating the second switch in response to a second pulse signal added to the voltage signal. Via the first pulse signal, the first switching circuit is activated and the first light emitting diode circuit is switched on. Via the second pulse signal, the second switching circuit is activated and the second light emitting diode circuit is switched on, but only after the first switching circuit has been activated.

An embodiment of the driver is defined by the first and the second pulse signals being separate sequential pulse signals to activate the first and the second switch sequentially, or being a combined pulse signal having a duration that is sufficiently long to activate the first and the second switch sequentially. Further switching circuits and further light emitting diode circuits are not to be excluded.

An embodiment of the driver is defined by the first and the second terminal being arranged to be coupled to electrodes of a third light emitting diode circuit, the third light emitting diode circuit being switched on via the voltage signal and the first light emitting diode circuit being switched on via the first pulse signal, and each light emitting diode circuit being switched off via the voltage signal. By interrupting the voltage signal or sufficiently reducing an amplitude of the voltage signal, all switching circuits can be deactivated simultaneously and all light emitting diode circuits can be switched off simultaneously.

An embodiment of the driver is defined by the driver being arranged to avoid clock signals, and to avoid separate wiring for power and control, and/or to drive light emitting diode circuits having only two electrodes each and having no third control electrode, each light emitting diode circuit comprising one or more light emitting diodes of whatever kind and in whatever connection, each light emitting diode having only two electrodes and no third control electrode.

According to a second aspect, a device is provided comprising the driver and further comprising the first light emitting diode circuit and/or the source and/or a pulse generator for adding the pulse signal to the voltage signal.

An insight could be that power and control may be realized through different signals via the same wire. A basic idea could be that a first section comprising a serial connection of a first light emitting diode circuit and a first switching circuit may be powered via a voltage signal and may be controlled via a first pulse signal added to the voltage signal.

The problem of providing an improved driver has been solved. A further advantage could be that the driver does not require separate wiring for power and control and does not require clock signals in the driver itself and does not require the light emitting diode (circuit) to have a third control electrode. First and second (parallel) sections each comprising a serial connection of a light emitting diode circuit and a switching circuit can be easily switched on and/or activated sequentially.

These and other aspects of the invention will be apparent from and elucidated with reference to the embodiments described hereinafter.

DETAILED DESCRIPTION OF EMBODIMENTS

Figure 1:
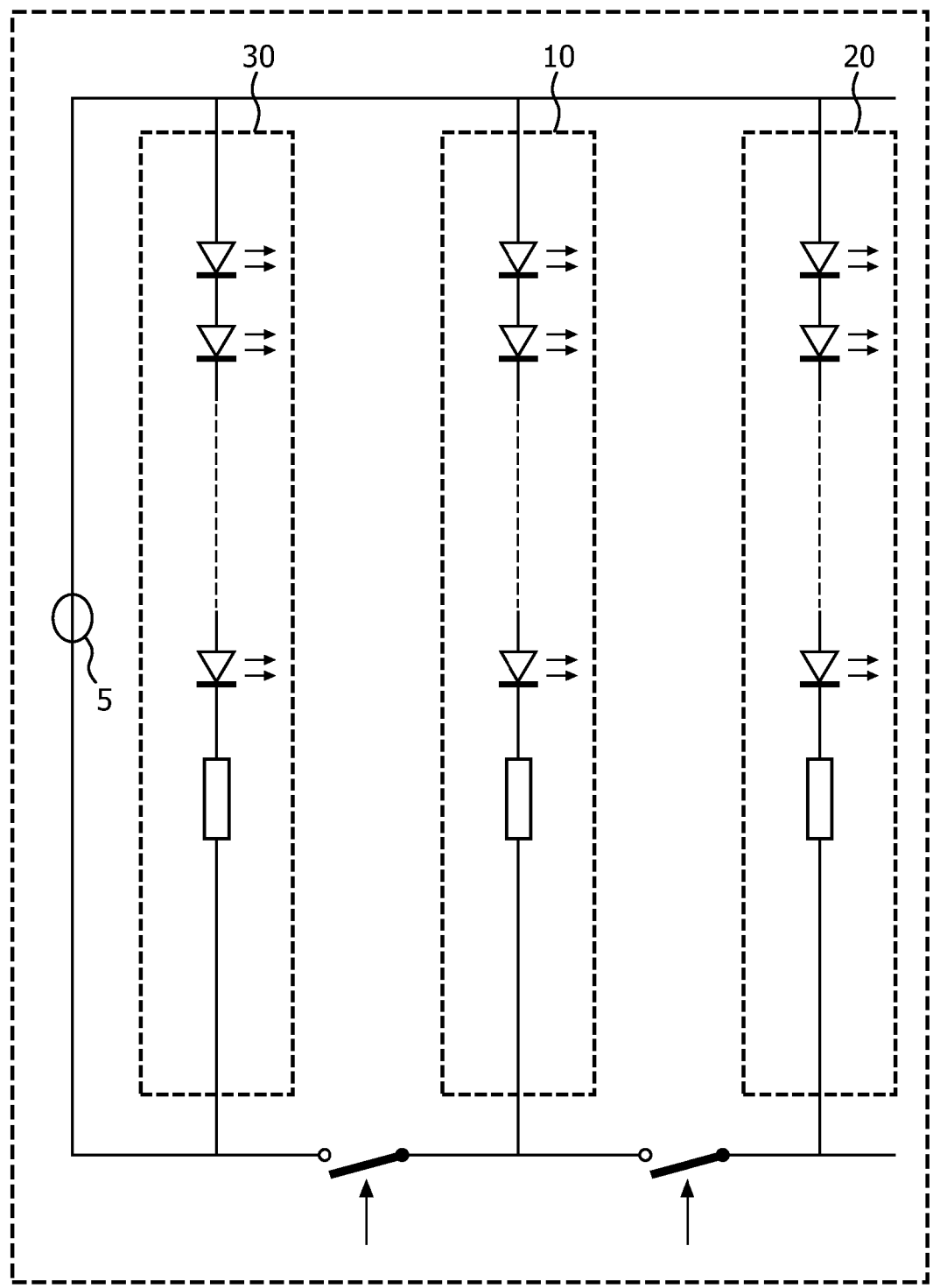
FIG. 1 shows prior art.

In FIG. 1, a prior art device is shown comprising a source 5, a first light emitting diode circuit 10 connected to one side of the source 5 and via a switch to the other side of the source 5, a second light emitting diode circuit 20 connected to said one side of the source 5 and to the switch via a further switch, and a third light emitting diode circuit 30 connected in parallel to the source 5. By switching on the source 5, which for example provides a direct current voltage signal or DC voltage signal, the third light emitting diode circuit 30 is switched on, after which, by bringing the switch into a conductive mode, the first light emitting diode circuit 10 is switched on, and after that, by bringing the further switch into a conductive mode, the second light emitting diode circuit 20 is switched on. The switches must be controlled, therefore this prior art device has separate power wiring and control wiring.

Figure 2:
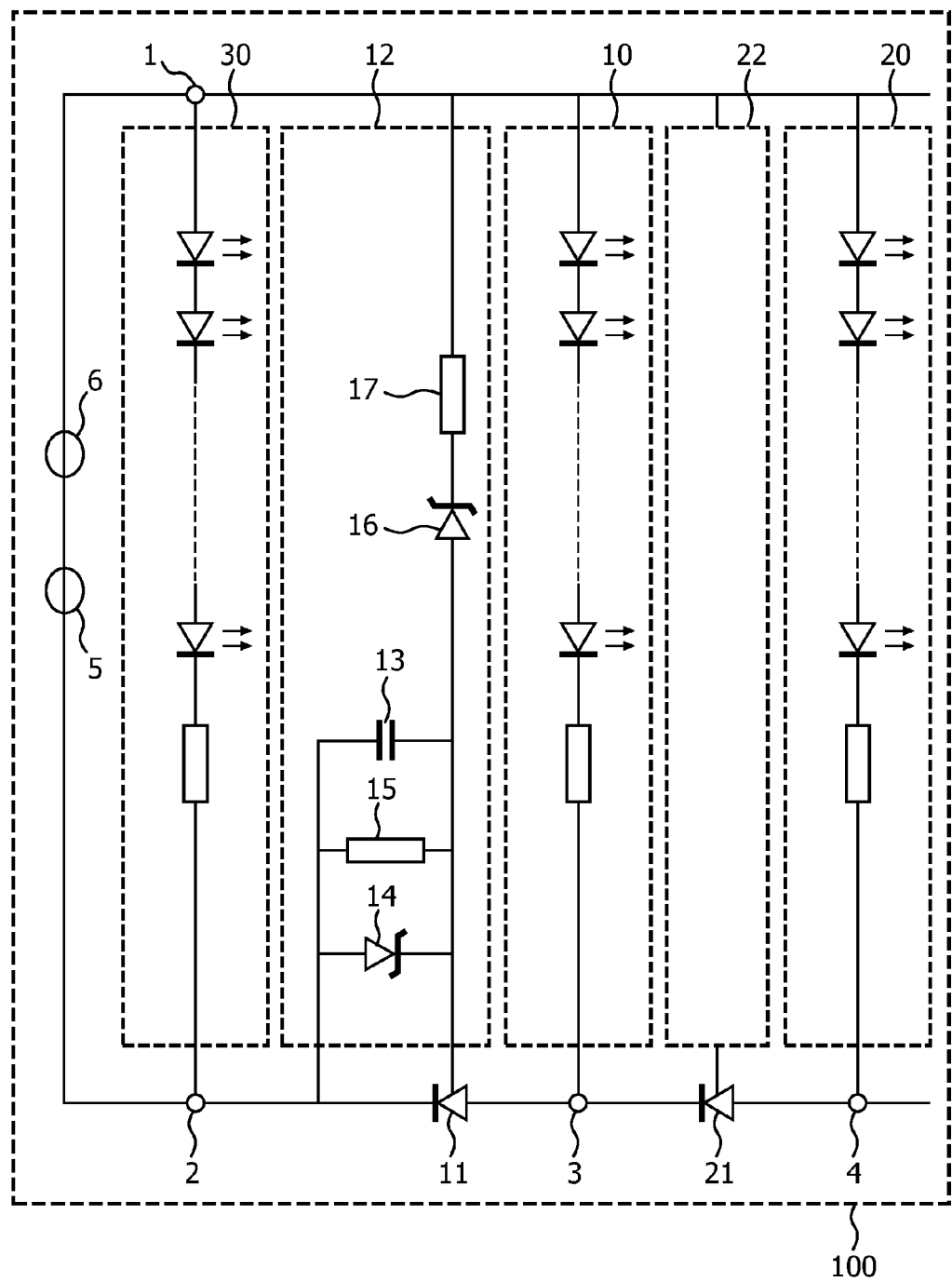
FIG. 2 shows a first improvement for a device.

In FIG. 2, a first improvement for a device 100 is shown. The device 100 comprises a driver with components 1, 2, 3, 4, 11, 12, 21, 22, a source 5, a pulse generator 6, and light emitting diode circuits 10, 20, 30. Alternatively, the source 5 or the pulse generator 6 or a combination of the source 5 and the pulse generator 6 may be located outside the device 100. Alternatively, the source 5 and the pulse generator 6 may be combined into a single unit. Alternatively, the light emitting diode circuits 10, 20, 30 may be located outside the device 100.

The driver comprises a first and a second terminal 1, 2 for receiving a voltage signal from the source 5, and comprises a first switching circuit 11, 12 connected to the second terminal 2 and to a third terminal 3. The first and the third terminal 1, 3 are arranged for being connected to electrodes of the first light emitting diode circuit 10. The first switching circuit 11, 12 comprises a first switch 11 and a first timing circuit 12 for activating the first switch 11 in response to a first pulse signal, coming from the pulse generator 6, added to the voltage signal. Said voltage signal is for example a direct current voltage signal or DC voltage signal. Preferably, the first switch 11 is of a kind that, when activated, goes into a conductive mode and stays in that conductive mode independently of the first pulse signal. Examples of such first switches 11 are a thyristor or a triac or a transistor circuit for replacing a thyristor or a triac. Such transistor circuits are of common general knowledge to a person skilled in the art.

The first switch 11, here in the form of a thyristor, has main electrodes connected to the second and the third terminal 2, 3, and the first timing circuit 12 comprises a capacitor 13. One side of the capacitor 13 is connected to the second terminal 2 and the other side of the capacitor 13 is connected to a control electrode of the first switch 11. The other side of the capacitor 13 is connected via a first threshold circuit 16, 17 to the first terminal 1. The first threshold circuit 16, 17 for example comprises a first zener diode 16 or a serial connection of a first zener diode 16 and a resistor 17. Here, the first threshold circuit 16, 17 prevents the capacitor 13 from being charged by the voltage signal from the source 5. A threshold voltage of the first zener diode 16 may be chosen relatively equal to an amplitude of the voltage signal. The resistor 17 may be used to define, in combination with the capacitor 13, a time constant for charging the capacitor 13.

The first timing circuit 12 may further comprise a second threshold circuit 14, 15 connected in parallel to the capacitor 13. The second threshold circuit 14, 15 protects the first switch 11 against peak voltages and may for example comprise a second zener diode 14 or a parallel connection of a second zener diode 14 and a resistor 15. The resistor 15 is used, in combination with the capacitor 13, to (better) define the time constant and/or to (better) discharge the capacitor 13 when necessary.

The driver may further comprise a second switching circuit 21, 22 connected to the third terminal 3 and to a fourth terminal 4. The first and the fourth terminal 1, 4 are arranged to be connected to electrodes of a second light emitting diode circuit 20. The second switching circuit 21, 22 comprises a second switch 21 and a second timing circuit 22 for activating the second switch 21, for an activated first switch 11, in response to a second pulse signal, coming from the pulse generator 6, added to the voltage signal. The second switching circuit 21, 22 may be designed relatively similar to the first switching circuit 11, 12. The first and second pulse signals may be separate sequential pulse signals to activate the first and second switch 11, 21 sequentially or may be a combined pulse signal having a duration sufficiently long to activate the first and the second switch 11, 21 sequentially. As a result, the first and the second light emitting diode circuit 10, 20 can be switched on sequentially.

The first and the second terminal 1, 2 may be arranged to be connected to electrodes of a third light emitting diode circuit 30. The third light emitting diode circuit 30 is switched on via the voltage signal and the first (second) light emitting diode circuit 10 (20) is switched on via the first (second) pulse signal. Each light emitting diode circuit 10, 20, 30 is switched off via the voltage signal.

Figure 3:
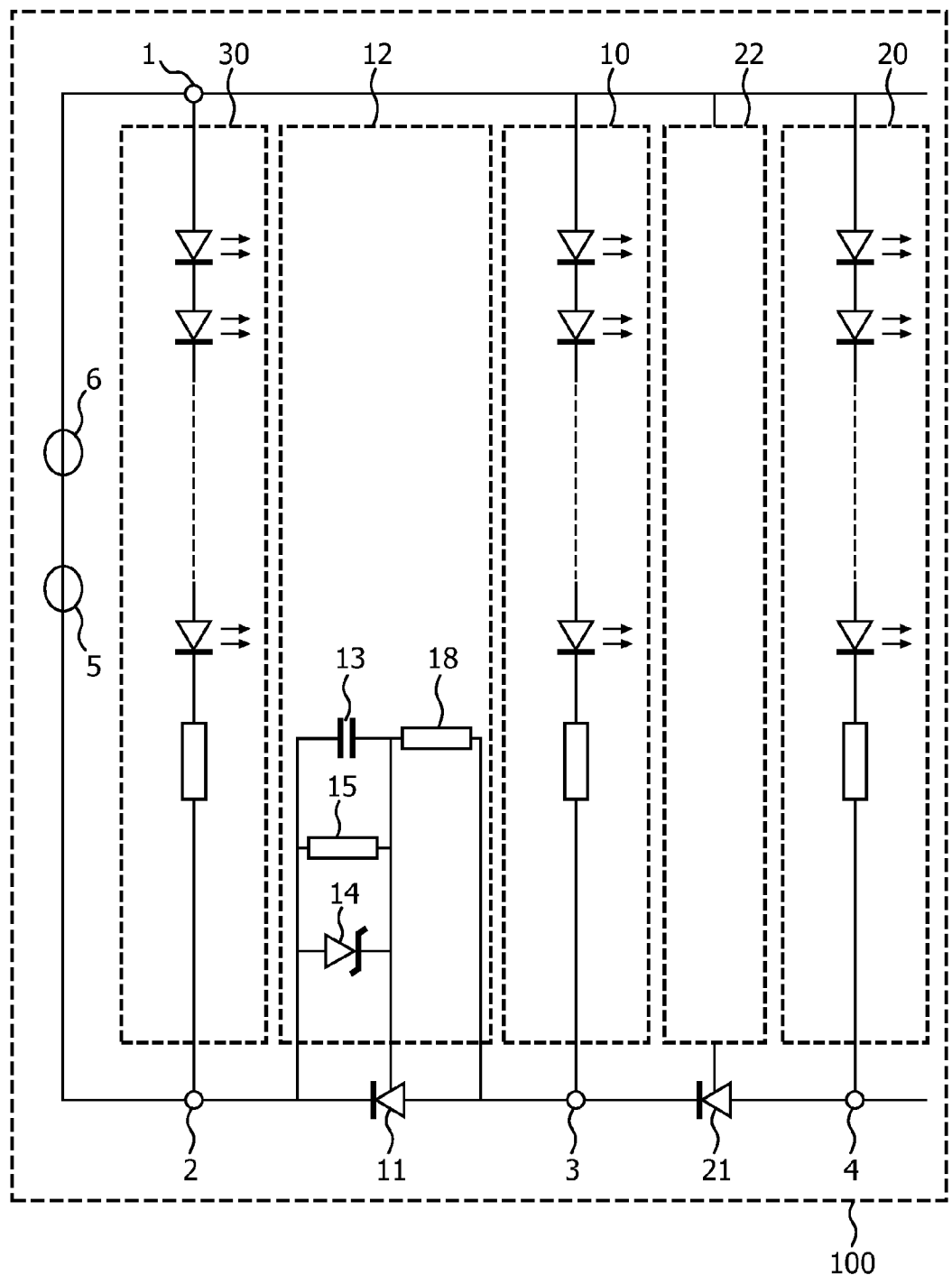
FIG. 3 shows a second improvement for a device.

In FIG. 3, a second improvement for a device 100 is shown. This second improvement is identical to the first improvement, with the exception that the first threshold circuit 16, 17 has been replaced by a resistor 18 connected to the other side of the capacitor 13 and to the third terminal 3. Here, the first light emitting diode circuit 10 prevents the capacitor 13 from being charged by the voltage signal. An operating voltage of the first light emitting diode circuit 10 may be chosen relatively equal to an amplitude of the voltage signal. The resistor 18 may be used to (better) define the time constant.

The first pulse signal may have a duration within a predefined duration range for a given amplitude of the first pulse signal, and/or the first pulse signal may have an amplitude within a predefined amplitude range for a given duration of the first pulse signal, and/or the first pulse signal may have a duration within a predefined duration range as well as an amplitude within a predefined amplitude range. Both improvements as shown in FIGS. 2 and 3 allow clock signals to be avoided inside the driver, allow separate wiring for power and control to be avoided inside the driver, and/or allow light emitting diode circuits 10, 20, 30 to have each two electrodes only and allow said circuits to avoid a third control electrode that is to be driven by the driver. Each light emitting diode circuit 10, 20, 30 may comprise one or more light emitting diodes of whatever kind and in whatever connection, and each light emitting diode may have two electrodes only and does not need to have a third control electrode as shown in U.S. Pat. No. 6,452,342.

Figure 4:
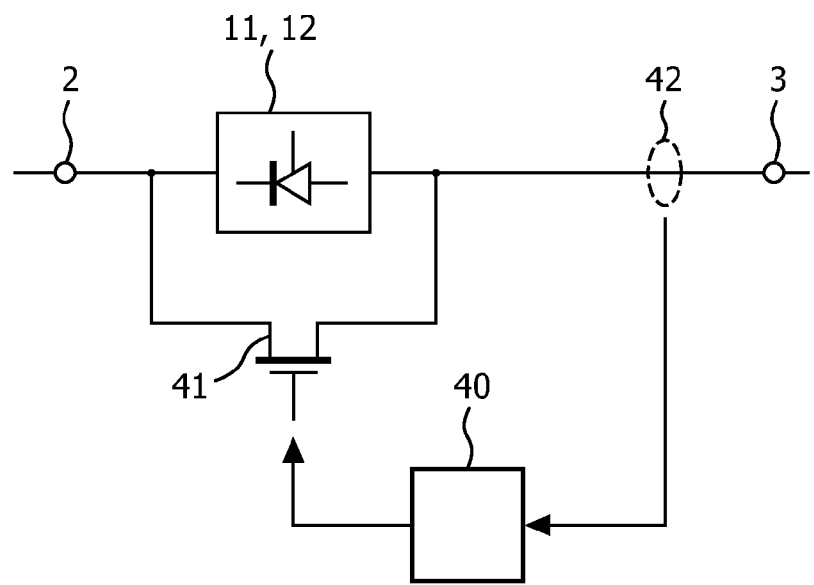
FIG. 4 shows an improved switching circuit.

In FIG. 4, an improved first switching circuit 11, 12 is shown. A transistor 41 for reducing a voltage present across the first switch 11 when activated has been added. Main electrodes of the first switch 11 are connected to main electrodes of the transistor 41 and a control electrode of the transistor 41 is connected to a detection circuit 40 for detecting a current flowing through the first switching circuit 11, 12. This may be done via current determination 42. A similar construction may be introduced for the second switch 21, etc.

Figure 5:
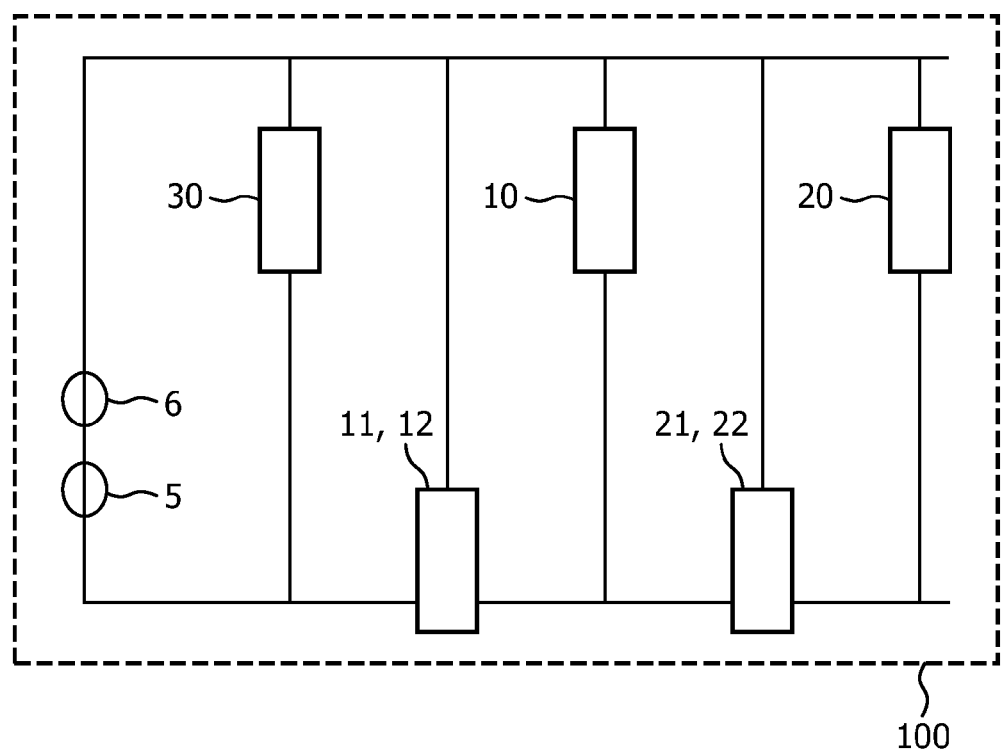
FIG. 5 shows a first embodiment of a device.

In FIG. 5, a first embodiment of a device 100 is shown, in line with the improvements shown in FIGS. 2 and 3.

Figure 6:
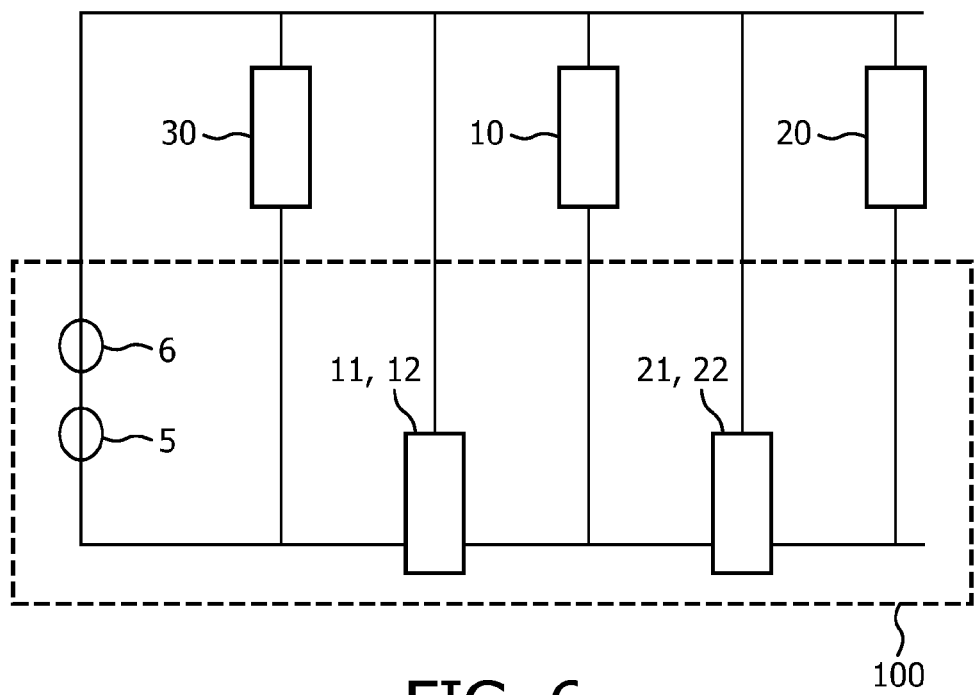
FIG. 6 shows a second embodiment of a device.

In FIG. 6, a second embodiment of a device 100 is shown, wherein the light emitting diode circuits 10, 20, 30 are located outside the device 100. Further, the source 5 might be located outside the device 100.

Figure 7:
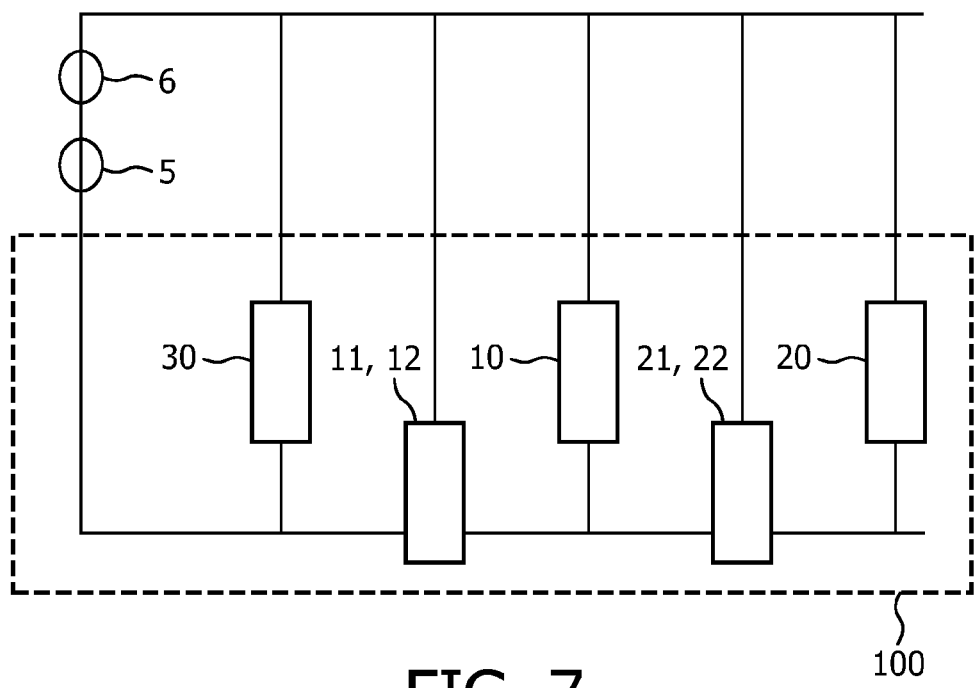
FIG. 7 shows a third embodiment of a device.

In FIG. 7, a third embodiment of a device 100 is shown, wherein source 5 and the pulse generator 6 are located outside the device 100. Further, the pulse generator 6 may be located inside the device 100.

The voltage signal is a DC voltage signal, and the light emitting diode circuits 10, 20, 30 are arranged to be powered by such a DC voltage signal. To this end, each light emitting diode circuit for example comprises a serial connection of a string of light emitting diodes and a resistor for compensating a voltage drop across a switch that switches a next light emitting diode circuit. So, in FIGS. 2 and 3, the resistors in the respective light emitting diode circuits 30, 10 and 20 may get the respective exemplary values 20, 10 and 0 Ohm. The capacitor 13 may have an exemplary value of 150 nF, the zener diode 16 may have an exemplary threshold value of about 30 Volt, the resistor 15 may have an exemplary value of 1 kOhm, the resistors 17 and 18 may have an exemplary value of 5 kOhm, and the zener diode 14 may have an exemplary threshold value of about 3 Volt, without other values being excluded. Instead of a string of light emitting diodes, other combinations of light emitting diodes may be introduced. The source 5 is for example a converter for converting an alternating current mains voltage signal or AC mains voltage signal into the DC voltage signal or is for example a switched mode power supply or a battery, etc.

The voltage signal could alternatively be an alternating current voltage signal or AC voltage signal, in which case the switching circuits 11, 12, 21, 22 need to be chosen such that they can handle such an AC voltage signal, and in which case the light emitting diode circuits 10, 20, 30 need to be arranged for being powered with such an AC voltage signal. For this purpose, each light emitting diode circuit may be provided with a rectifier, or may be provided with for example so-called AC LEDs or anti-parallel combinations of light emitting diodes. A disadvantage could be in this case that each pulse signal, after being generated once, must be repeated immediately after each zero-passage of the AC voltage signal, as long as the corresponding light emitting diode circuit needs to be on (unless further measures are taken to keep a switch 11, 21 activated during a zero-passage of the AC voltage signal). An advantage could be that the light emitting diode circuits 10, 20 on the one hand and the light emitting diode circuit 30 on the other hand can be switched off more individually (read: after each zero-passage of the AC voltage signal, each light emitting diode circuit 10, 20 behind a switch could be automatically switched off while the light emitting diode circuit 30 closest to the source is kept on) etc.

Summarizing, to avoid clock signals as well as separate wiring for power and control in a driver, and to avoid three-terminal light emitting diodes with control electrodes, a driver for driving light emitting diode circuits 10, 20, 30 is provided with first and second terminals 1, 2 for receiving a voltage signal from a source 5 and with a first switching circuit 11, 12 coupled to the second terminal 2 and to a third terminal 3. The first and the third terminal 1, 3 are to be coupled to electrodes of a first light emitting diode circuit 10. The first switching circuit 11, 12 comprises a first switch 11 and a first timing circuit 12 for, in response to a first pulse signal as added to the voltage signal, activating the first switch 11 to switch on the first light emitting diode circuit 10. Sequential pulse signals may be used to sequentially switch on light emitting diode circuits 10, 20.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A driver for driving light emitting diode circuits comprising
   first and second terminals for receiving a voltage signal from a source, and
   a first switching circuit coupled to the second terminal and to a third terminal, the first and the third terminal being arranged to be coupled to electrodes of a first light emitting diode circuit, and the first switching circuit comprising a first switch and a first timing circuit for, in response to a first pulse signal added to the voltage signal, activating the first switch, the first switch, when activated, being in a conductive mode and then staying in that conductive mode independently of the first pulse signal.

2. The driver as defined in claim 1, the first switch comprising a thyristor or a triac or a transistor circuit for replacing a thyristor or a triac.

3. The driver as defined in claim 1, the first switch having main electrodes coupled to the second and third terminals, and the first timing circuit comprising a capacitor, one side of the capacitor being coupled to the second terminal and the other side of the capacitor being coupled to a control electrode of the first switch.

4. The driver as defined in claim 3, the other side of the capacitor being coupled via a first threshold circuit to the first terminal.

5. The driver as defined in claim 3, the other side of the capacitor being coupled via a resistor (18) to the third terminal.

6. The driver as defined in claim 3, the first timing circuit further comprising a second threshold circuit coupled in parallel to the capacitor.

7. The driver as defined in claim 1, the first switching circuit further comprising a transistor for reducing a voltage present across the first switch when activated.

8. The driver as defined in claim 7, main electrodes of the first switch being coupled to main electrodes of the transistor and a control electrode of the transistor being coupled to a detection circuit for detecting a current flowing through the first switching circuit.

9. The driver as defined in claim 1, the first pulse signal having a duration within a predefined duration range for a given amplitude of the first pulse signal, and/or the first pulse signal having an amplitude within a predefined amplitude range for a given duration of the first pulse signal, and/or the first pulse signal having a duration within a predefined duration range as well as an amplitude within a predefined amplitude range.

10. The driver as defined in claim 1, further comprising
    a second switching circuit coupled to the third terminal and to a fourth terminal, the first and the fourth terminal being arranged to be coupled to electrodes of a second light emitting diode circuit, and the second switching circuit (21, 22) comprising a second switch and a second timing circuit for, for an activated first switch, activating the second switch in response to a second pulse signal added to the voltage signal.

11. The driver as defined in claim 10, the first and second pulse signals being separate sequential pulse signals to activate the first and second switch sequentially or being a combined pulse signal having a duration sufficiently long to activate the first and the second switch sequentially.

12. The driver as defined in claim 1, the first and the second terminal being arranged to be coupled to electrodes of a third light emitting diode circuit (30), the third light emitting diode circuit being switched on via the voltage signal and the first light emitting diode circuit being switched on via the first pulse signal, and each light emitting diode circuit being switched off via the voltage signal.

13. The driver as defined in claim 1, the driver being arranged to avoid clock signals, and to avoid separate wiring for power and control, and/or to drive light emitting diode circuits each having two electrodes only and no third control electrode, each light emitting diode circuit comprising one or more light emitting diodes of whatever kind and in whatever connection, each light emitting diode having two electrodes only and no third control electrode.

14. A device comprising the driver as defined in claim 1 and further comprising the first light emitting diode circuit and/or the source and/or a pulse generator for adding the pulse signal to the voltage signal.

* * * * *